United States Patent
Kameya

(10) Patent No.: US 7,199,538 B2
(45) Date of Patent: Apr. 3, 2007

(54) MOTOR DRIVING SYSTEM

(75) Inventor: Hisashi Kameya, Kariya (JP)

(73) Assignee: Denso Corporation, Kariya (JP)

( * ) Notice: Subject to any disclaimer, the term of this patent is extended or adjusted under 35 U.S.C. 154(b) by 4 days.

(21) Appl. No.: 10/972,444

(22) Filed: Oct. 26, 2004

(65) Prior Publication Data

US 2005/0093505 A1    May 5, 2005

(30) Foreign Application Priority Data

Nov. 4, 2003    (JP) .............................. 2003-374079

(51) Int. Cl.
*H02P 6/06*    (2006.01)
*H02P 6/12*    (2006.01)

(52) U.S. Cl. .................... 318/139; 318/599; 318/254; 318/434; 318/439; 180/443

(58) Field of Classification Search ..................... None
See application file for complete search history.

(56) References Cited

U.S. PATENT DOCUMENTS

| | | | |
|---|---|---|---|
| 5,583,406 A * | 12/1996 | Mutoh et al. ................ | 318/376 |
| 5,959,430 A * | 9/1999 | Yuki et al. ................... | 318/805 |
| 6,194,856 B1 * | 2/2001 | Kobayashi et al. ......... | 318/432 |
| 6,693,404 B2 * | 2/2004 | Hiraga et al. ................ | 318/729 |
| 6,727,669 B2 * | 4/2004 | Suzuki et al. ................ | 318/139 |
| 6,737,828 B2 * | 5/2004 | Kiuchi et al. ................ | 318/779 |
| 6,844,697 B2 * | 1/2005 | Masaki et al. .............. | 318/721 |
| 2004/0113572 A1 * | 6/2004 | Iwaji et al. .................. | 318/254 |

FOREIGN PATENT DOCUMENTS

| | | |
|---|---|---|
| JP | A-2001-8488 | 1/2001 |
| JP | A-2003-164159 | 6/2003 |

* cited by examiner

*Primary Examiner*—Lincoln Donovan
*Assistant Examiner*—Eduardo Colon Santana
(74) *Attorney, Agent, or Firm*—Posz Law Group, PLC

(57) ABSTRACT

A motor driving system for an electric motor includes a pulse width modulating circuit which provides driving pulse signals whose pulse width is modulated to have a prescribed duty ratio, an inverter having PWM-controlled switch elements, a voltage calculating circuit which calculates levels of voltage to be respectively applied between the power source and the phase windings, a current calculating circuit which calculates reference values of current of the inverter from levels of the voltage applied between the power source and the phase windings of the electric motor and resistances disposed between the power source and the phase windings, a current detecting circuit which detects actual values of current of the inverter, and a processor which judges abnormality if one of the actual value of current of the inverter is a preset value different from corresponding one of the reference values.

9 Claims, 8 Drawing Sheets

MOTOR DRIVING SYSTEM

CROSS REFERENCE TO RELATED APPLICATION

The present application is based on and claims priority from Japanese Patent Application 2003-374079 filed Nov. 4, 2003, the contents of which are incorporated herein by reference.

BACKGROUND OF THE INVENTION

1. Field of the Invention

The present invention relates to a motor driving system and, particularly, a current detecting arrangement of the motor driving system.

2. Description of the Related Art

Recently, brush-less motors are widely used because of their good durability and high performance. The brush-less motor usually has a rotor and a stator that has a plurality of phase windings. The brush-less motor is driven by the phase windings, which are energized with current that is controlled according to rotation position of the rotor. The rotation position of the rotor may be directly sensed by a position sensor such as a Hall element (sensor type) or calculated from the terminal voltage of the brush-less motor (sensor-less type).

The efficiency of the brush-less motor changes widely according to the detection accuracy of the rotation position. In case of the sensor type, the detection accuracy may become lower when a position sensor is not positioned at a right place, while the detection accuracy may become lower when motor terminal voltage abruptly changes or includes noises in case of the sensor-less type.

Because the rotor of the brush-less motor usually has a permanent magnet, the magnetic flux of the permanent magnet may be reduced or degaussed if an excessive amount of current is supplied to the motor. The degaussing increases input current in order to provide a prescribed output torque. The magnetic flux is also insufficient if the permanent magnet is not correctly magnetized during the manufacturing step of the rotor.

As shown in FIG. 9, a well-known inverter for driving a brush-less motor includes a DC power source Vs, a H-shaped bridge circuit two pair of arms 61, 62 and an electric load R and a controller. One of the arms 61, 62 is composed of an upper arm-side switch SW1 and a lower arm-side switch SW2, and the other is composed of an upper arm-side switch SW3, and a lower arm-side switch SW4. The controller controls the switches SW1–SW4 in a PWM (pulse width modulation) mode to turn on or off so as to provide an appropriate AC voltage across the electric load R.

It is well-known that an amount of phase current can be detected by a current sensing resistor element disposed between one of the lower arm-side switches SW2, SW4 and a lower voltage terminal of the DC power source. However, if the duty ratio of the lower arm-side switch SW1 or SW2 becomes less than 30%, the wave-shape of the voltage applied to the lower arm-side switch may be flattened, resulting in that the lower arm-side switch cannot turn on. Accordingly, a Hall element, which is more expensive than the current sensing resistor element, has to be used in order to detect an accurate amount of the phase current.

JP-A 2001-8488 discloses an abnormality detecting device for a brush-less motor that detects an abnormality of a brush-less motor by current supplied to a phase-winding of the motor. That is, if the current supplied to the phase winding of the brush-less motor is too small to turn on the lower arm-side switch, the amount of the current is detected from current supplied to other phase windings.

JP-A 2003-164159 discloses a current detecting device, which is not used for detecting abnormality of a brush-less motor. Even if such a current detecting device is combined to the abnormality detecting device disclosed in JP-A 2001-8488, an abnormality of the brush-less motor may not be detected unless the amount of current supplied to the brush-less motor becomes larger than a predetermined amount.

For example, if a short-circuiting takes place between a current sensor 9 and one of terminals 308, 309, 310, in a motor driving system shown in FIG. 3, little short-circuit current flows to one of current sensors 314, 315, 316. Thus, it is difficult to detect an abnormality of the brush-less motor.

SUMMARY OF THE INVENTION

Therefore, an object of the invention is to provide an improved motor driving system in which very accurate amount of current can be detected.

According to a main feature of the invention, a motor driving system for an electric motor having a plurality of phase windings includes a power source, a pulse width modulating circuit which provides driving PWM signals for driving the phase windings, an inverter having PWM-controlled first switch elements respectively disposed between the phase windings and the power source and PWM-controlled second switch elements respectively disposed between the phase windings and a ground, a voltage calculating circuit for calculating levels of input voltage (Vi) to be respectively applied between the power source and the phase windings of the electric motor, a current calculating circuit for calculating reference values of current of the inverter from levels of the voltage applied between the power source and the phase windings of the electric motor and resistances disposed between the power source and the phase windings of the electric motor, a current detecting circuit for detecting actual values of current of the inverter, and means for judging abnormality if one of the actual values of current of the inverter is a preset value different from corresponding one of the reference values.

By the above feature, an amount of current flowing through the inverter can be accurately calculated without using many sensors, so that the size of the motor driving system can be made compact at a low cost.

In the motor driving system that is featured as above, the voltage calculating circuit includes means for calculating levels of input voltage (Vi) according to the following expression: Vi=Vp×Rd−(voltage applied to said motor), wherein Vp is power source voltage, and Rd is a duty ratio of the driving pulse signals. Therefore, no sensor is necessary to detect the levels of voltages (Vi).

In the motor driving system that is featured as above, the means for judging includes means for comparing the actual value of current of the inverter and corresponding one of the reference values. Therefore, an accurate sensing of abnormality of current can be attained.

In the motor driving system that is featured as above, the current detecting circuit may include means for calculating an actual value of current of the inverter from other detected actual values of current of the inverter.

The motor driving system as above may include means for providing command current values based on the voltage applied to the motor, motor current and the number of rotation of said motor. In this case, the means for judging judges abnormality if one of the command current values is a preset value different from corresponding one of the reference values.

The motor driving system as above may include means for calculating reference values of vector current from the reference values of current of the inverter that is calculated by the current calculation circuit and means for calculating actual vector current from the actual values of current detected by the current detecting circuit. In this case, the means for judging judges abnormality if one of the actual vector current is a preset value different from corresponding one of the reference vector current.

According to another feature of the invention, a motor driving system includes a power source, a pulse width modulating circuit which provides driving pulse signals having pulses whose pulse width is modulated to have a prescribed duty ratio (Rd), an inverter having PWM-controlled first switch elements respectively disposed between the phase windings and the power source and PWM-controlled second switch elements respectively disposed between the phase windings and a ground, a current detecting circuit including means for calculating an actual value of current of the inverter from other detected actual values of current of the inverter, means for providing command current values based on the voltage applied to the motor, motor current and the number of rotation of said motor, and means for judging abnormality if one of the actual values of current of said inverter detected by the current detecting circuit is a preset value different from corresponding one of the command current values. Thus, abnormality of current can be accurately detected in another way.

According to another feature of the invention, a motor driving system for an electric motor having a plurality of phase windings includes a power source having a DC power source voltage (Vp), a pulse width modulating circuit (42) which provides driving pulse signals whose pulse width is modulated to have a prescribed duty ratio (Rd), an inverter having PWM-controlled first switch elements respectively disposed between the phase windings and the power source and PWM-controlled second switch elements respectively disposed between the phase windings and a ground, a current detecting circuit for detecting actual values of current of the inverter; means for calculating actual vector current values from the actual values of current detected by the current detecting circuit, means for providing command current values based on the voltage applied to the motor, motor current and the number of rotation of said motor, and means for judging abnormality if one of the actual vector current values is a preset value different from corresponding one of the command current values. Thus, abnormality of current can be accurately detected in another way.

According to another feature of the invention a motor driving system for an electric motor having a plurality of phase windings includes a power source having a DC power source voltage (Vp), a pulse width modulating circuit which provides driving pulse signals whose pulse width is modulated to have a prescribed duty ratio (Rd), an inverter having PWM-controlled first switch elements respectively disposed between the phase windings and said power source and PWM-controlled second switch elements respectively disposed between the phase windings and a ground, a current detecting circuit which includes means for calculating an actual value of current of the inverter from other detected actual values of current of said inverter, means for calculating actual vector current values from the actual values of current calculated by the current detecting circuit, means for providing command current values from the actual values of current detected by the current detecting circuit, and means for judging abnormality if one of the actual vector current values is a preset value different from corresponding one of the command current values. Thus, abnormality of current can be accurately detected in another way.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiment of the invention will be described with reference to the appended drawings.

Figure 1:
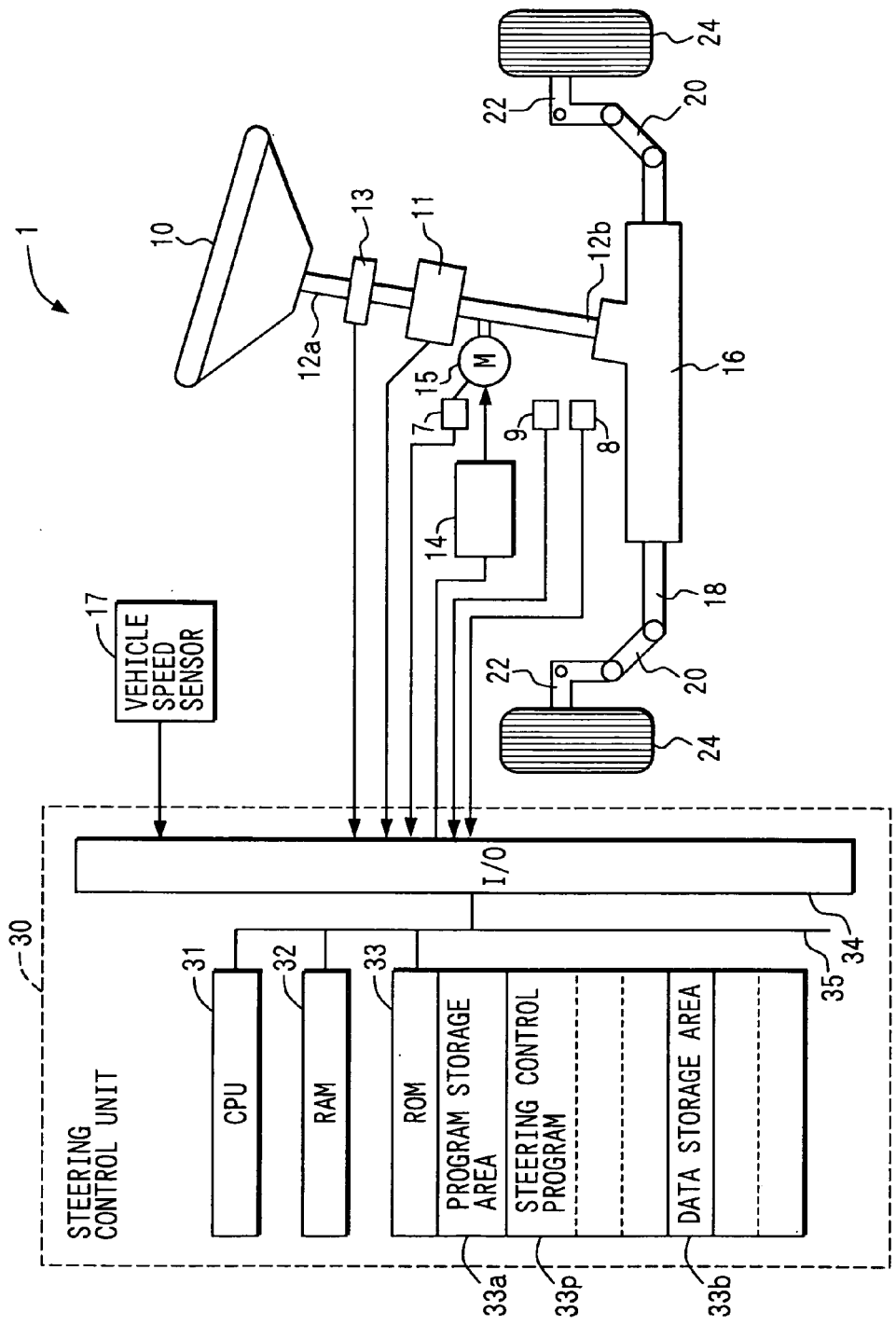
FIG. 1 is a schematic diagram illustrating an electrical power steering control system for a vehicle to which a motor driving system according to a preferred embodiment of the invention is applied.

As shown in FIG. 1, an electric power steering control system 1 includes a rotation angle sensor 7, a current detecting circuit 8, a voltage sensor 9, a steering wheel 10, a torque sensor 11, a steering shaft 12a, a pinion shaft 12b, a steering angle sensor 13, a motor driver 14, an electric motor 15, a steering box 16, a vehicle speed sensor 17, a rack bar 18, a pair of tie-rods 20, a pair of knuckle arms 22, a pair of vehicle wheels 24, a steering control unit 30, etc.

The steering wheel 10 is connected to the steering shaft 12a, the lower end of which is connected to the torque sensor 11. The torque sensor 11 is connected to the upper end of the pinion shaft 12b. The lower end of the pinion shaft 12b is connected to a pinion (not shown) that is accommodated in the steering box 16 to be in engagement with the rack bar 18. The tie rods 20 are respectively connected to the opposite ends of the rack bar 18 at their one ends. The other ends of the tie rods 20 are respectively connected to the vehicle wheels 24 via the knuckle arms 22. The pinion shaft 12b is connected to the motor 15 via gears (not shown).

The torque sensor 11 includes a torsion bar and a pair of well-known resolvers that are disposed on the steering shaft apart from each other in the axial direction to detect operation of the steering wheel 10. As the steering wheel 10 rotates, a corresponding torque is detected by the torque sensor 11, whose signal is transmitted to the steering control unit 30. The electric motor 15 is a brush-less motor and the rotation angle sensor 7 is mounted in it. The electric motor 15 can be replaced by any other electric motor that can be driven by the motor driving system 2. Each of the steering angle sensor 13 and the rotation angle sensor 7 is comprised of a well-known type sensor such as a rotary encoder or a resolver.

The resolver is a rotating transformer which is composed of a pair of stator windings and a rotor winding. The stator windings are disposed at a 90-degree mechanical angle from each other. The amplitude of the signal provided by magnetic connection between the rotor winding and the pair of stator windings is a function of the rotation position of the rotor relative to the stator windings. Therefore, the resolver provides two kinds of output signals that are modulated by a sine component and a cosine component. The output signals of the rotation angle sensor 7 are converted by a resolver rotation angle calculation unit 46 (shown in FIG. 2) to rotation angle data.

The steering control unit 30 includes a CPU 31 and a ROM 32, a ROM 33, an I/O interface 34 and bus lines 35 that connects the above units. The CPU 31 operates according to programs and data stored in the ROM 33 and RAM 32. The ROM 33 has a program storage area 33*a* and a data storage area 33*b*. The program storage area 33*a* stores a steering control program 33*p,* and the data storage area 33*b* stores data necessary for the steering control program to be executed.

The CPU 31 of the steering control unit 30 executes the steering control program stored in the ROM 33 according to an amount of torque sensed by the torque sensor 11 and steered angle sensed by the steering angle sensor 13 so as to calculate necessary output torque of the motor 15 and to control the motor driver 14, which applies voltage suitable for the necessary output torque to the motor 15.

Figure 8:
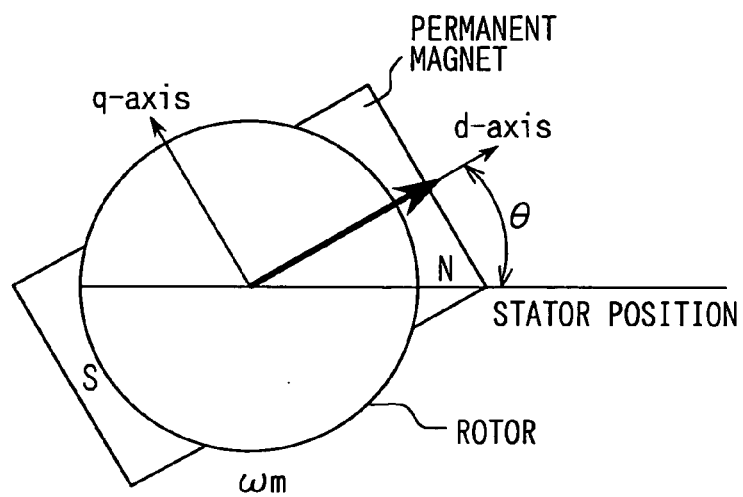
FIG. 8 is a schematic diagram showing a principle of vector control.
Figure 9:
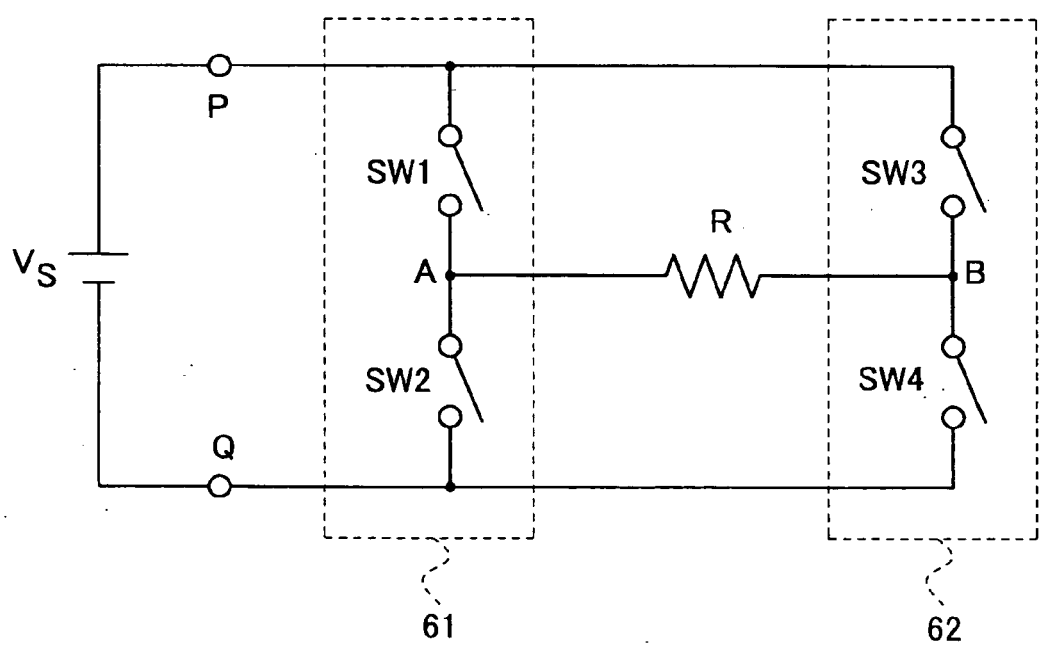
FIG. 9 is a circuit diagram of a prior art inverter circuit.

In the meanwhile, a vector control for controlling the electric motor 15 will be described with reference to FIG. 8. The output torque of a brush-less motor or a AC motor is a function of an amount of current to be supplied and a phase angle thereof. In other words, the stator current is divided into a current component (magnetic flux current) that forms a main magnetic flux of the motor and a current component (torque current) that advances by 90° in electric angle. The magnetic flux current component is a component that forms magnetic flux along d-axis, and the torque current component is a component that forms magnetic flux along q-axis. These current components can be calculated by a well-known two-to- three-phase conversion expression (E1) with an angle θ between the d-axis and a stator base position.

Figure 2:
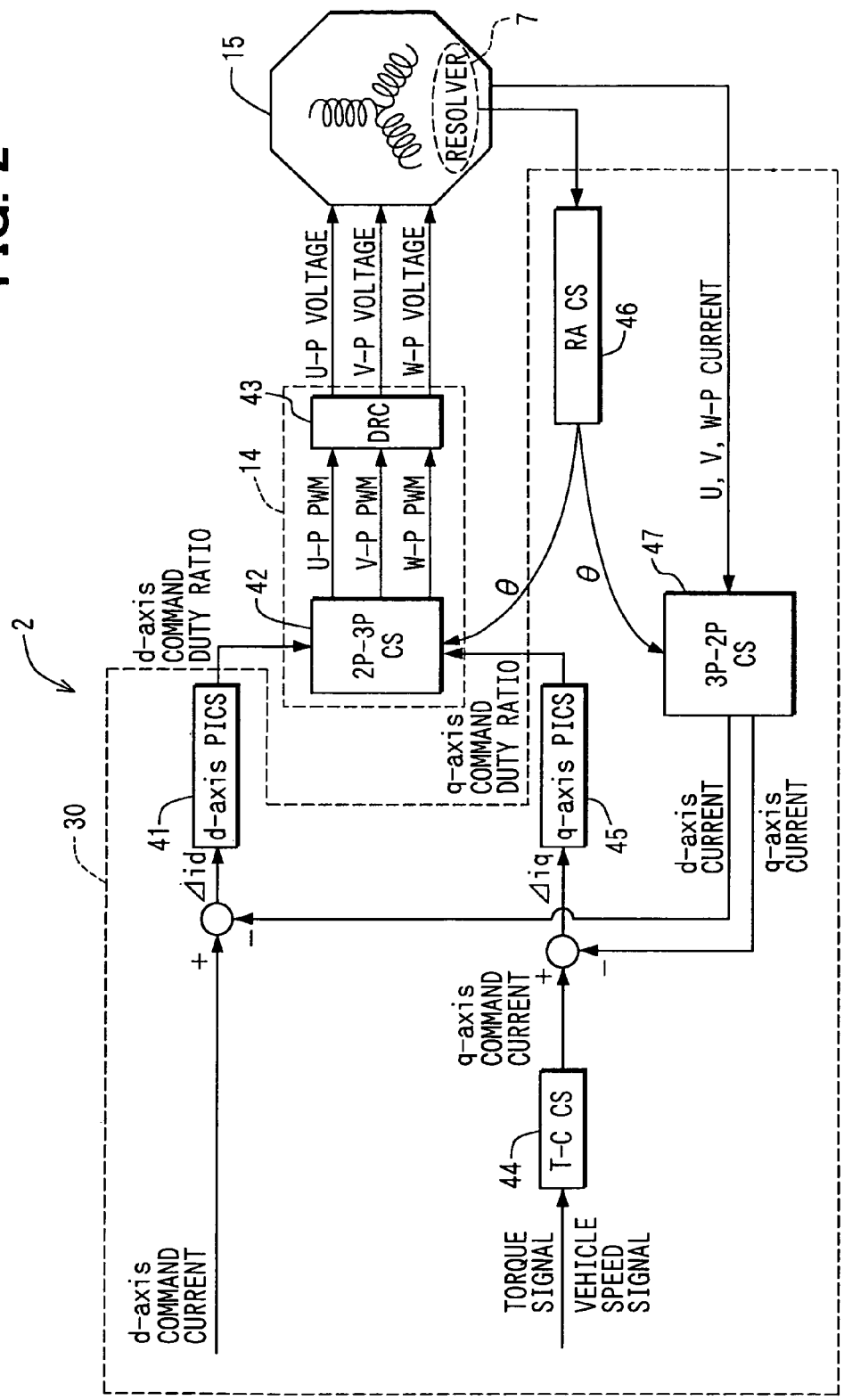
FIG. 2 is a block diagram of the motor driving system according to the preferred embodiment of the invention.

A motor driving system 2 of the electric power steering control system according to the preferred embodiment of the invention is shown in FIG. 2. The motor driving system includes a d-axis proportional integrating control section (d-axis PICS) 41, the motor driver 14 that includes a two-phase-to-three-phase converting section (2P–3P CS) 42 and a driver circuit (DRC) 43, torque-current converting section (T-C CS) 44, a q-axis proportional integrating control section (q-axis PICS) 45, a rotation angle calculating section (RA CS) 46 and a two-phase-to-three-phase converting section (2P-3P CS) 47.

The control process of the motor driving system 2 is repeated while the electric power steering control system 1 is executing the steering control program 33*p*. At first, angle θ is calculated by the rotation angle calculating section (RA CS) 46 according to the output signal of the motor rotation angle sensor (resolver) 7. That is:

$$\theta = \tan^{-1}(\sin(\text{output signal}) \div \cos(\text{output signal}))  \quad (a)$$

Subsequently, the amount of the d-axis current and the amount of the q-axis current are calculated by the three-to-two-phase conversion section (3P-2P CS) 47 from the calculated angle θ and the output signals of the current detecting circuit 8, as in the following expression E1:

$$\begin{bmatrix} d\text{-axis current} \\ q\text{-axis current} \end{bmatrix} = \frac{\sqrt{2}}{\sqrt{3}} \begin{bmatrix} \cos\theta & \cos(\theta - 120°) & \cos(\theta + 120°) \\ -\sin\theta & -\sin(\theta - 120°) & -\sin(\theta + 120°) \end{bmatrix} \begin{bmatrix} U\text{-phase current} \\ V\text{-phase current} \\ W\text{-phase current} \end{bmatrix}$$

Then, a difference Δid between the above d-axis current and a d-axis command current value that is calculated from the torque signal provided by the torque sensor 11 and the vehicle speed signal provided by the vehicle speed sensor 17 is obtained. Subsequently, a d-axis command duty ratio is obtained in the d-axis proportional integral control section (d-axis PICS) 41 to decrease the difference Δid to zero.

Also, a difference Δ iq between a q-axis command current value that is calculated from the torque signal and the vehicle speed in the torque-to-current converting section (T-C CS) and the q-axis current value that is calculated in the three-to-two-phase conversion section (3P-2P CS) 47 is obtained in the same manner. Subsequently, a q-axis command duty ratio is obtained in the q-axis proportional integral control section (d-axis PICS) 41 to decrease the difference Δ iq to zero.

Then, PWM duty ratios that respectively form voltage levels to drive the U-phase winding, V-phase winding and W-phase winding are calculated and provided in the two-phase-to-three-phase converting section (2P-3P CS) 42 based on the d-axis command duty ratio, the q-axis command duty ratio and the rotation angle θ. The driver circuit 43 forms the voltage levels to be respectively applied to the U, V and W-phase windings. Thus, the motor 15 rotates as programmed.

As shown in FIG. 4, the motor 15 has three (U, V, W) phase windings circumferentially disposed on a stator at equal intervals of an angle 120°. The rotation sensor 7 detects an angular position of the rotor 54 relative to the phase windings U, V, W or the stator. Then, the driver circuit 43 cyclically drives a pair of the phase windings U, V, W according to the output signal of the rotation sensor 7 to rotate the motor in a normal direction as shown in FIG. 4. On the other hand, the driver circuit 43 drives a pair of the phase windings U, V, W in the order opposite to FIG. 4 if it rotates the motor in the opposite direction.

Figure 3:
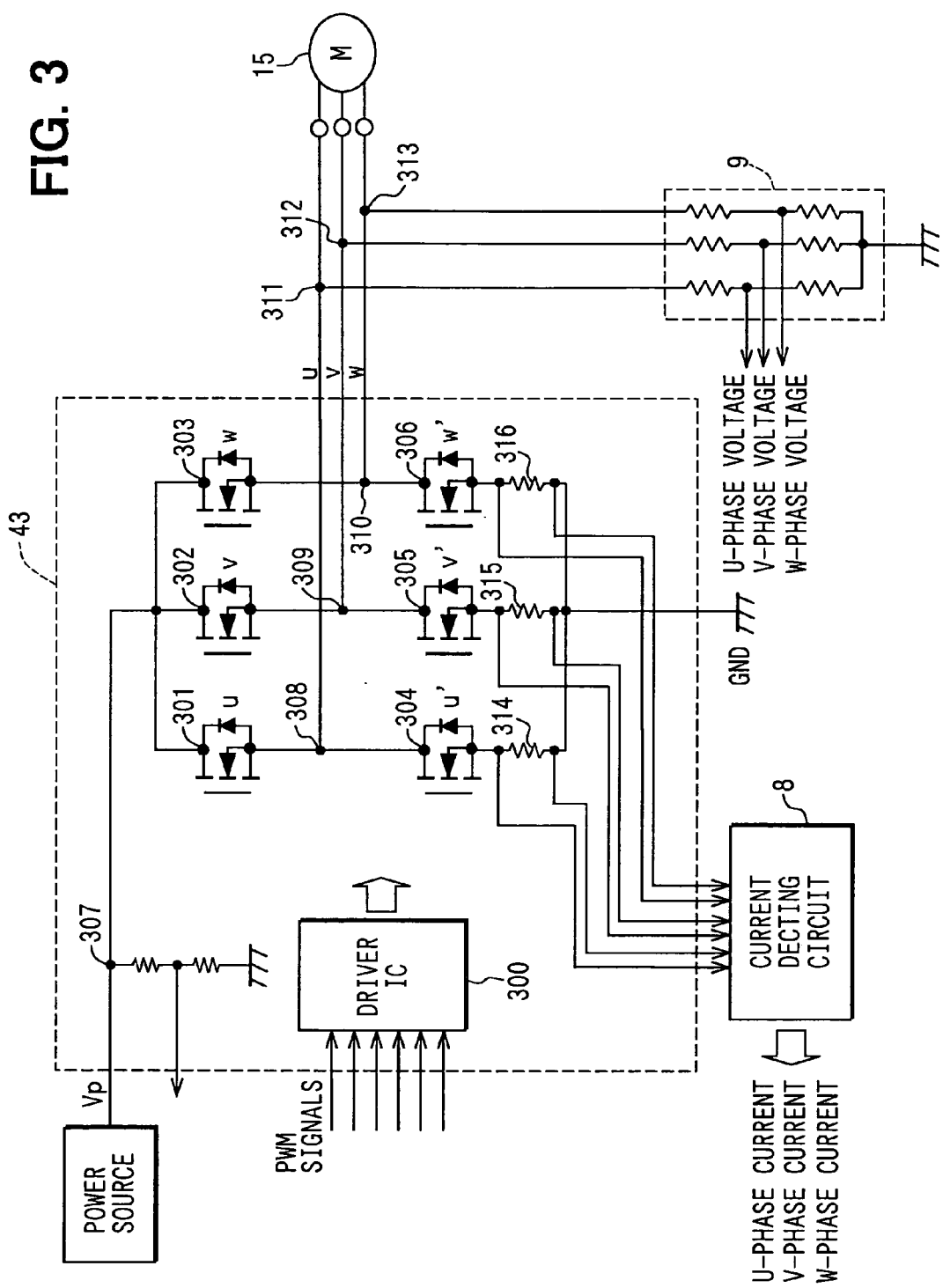
FIG. 3 is a circuit diagram of the motor driving system according to the preferred embodiment of the invention.
Figure 4A:
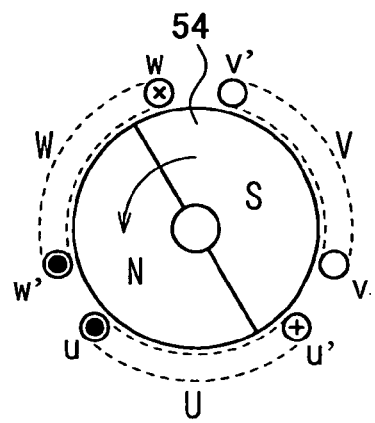
FIGS. 4A–4F are schematic diagrams illustrating operation of a brush-less motor.
Figure 4D:
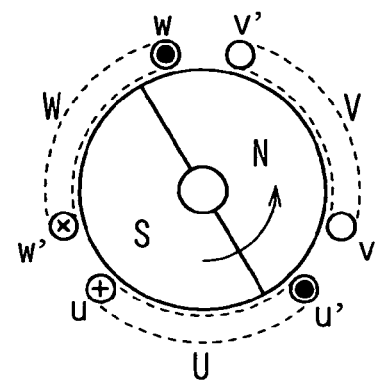
Figure 4B:
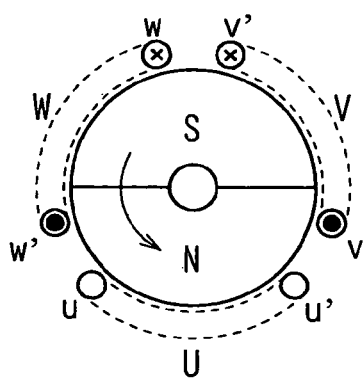
Figure 4E:
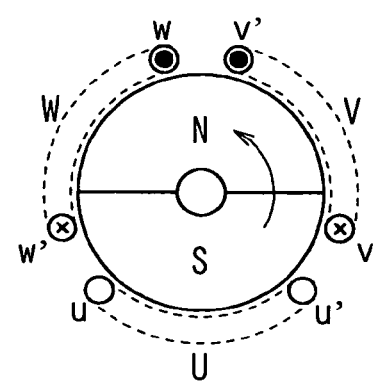
Figure 4C:
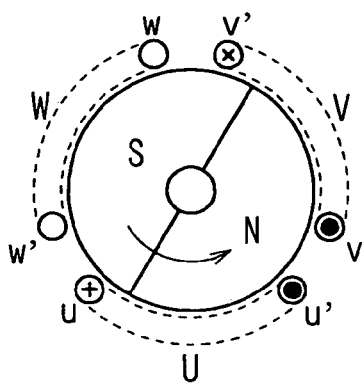
Figure 4F:
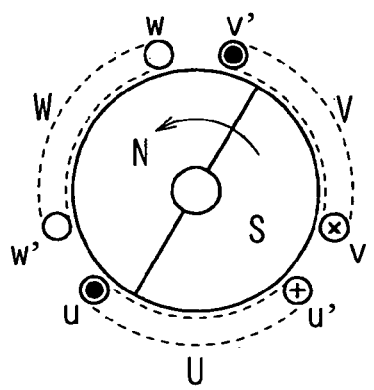

As shown in FIG. 3, the driver circuit 43 includes a driver IC 300 and a three-phase bridge circuit of six switching elements 301–306 with respective flywheel diodes u, v, w, u', v', w' being connected thereto. The switching elements 301–306 are controlled by the PWM signals sequentially provided by the driver two-phase-to-three-phase converting section 42 via the driver IC 300 to rotate the motor 15. In the meanwhile, the switching elements 301–303 are generally called upper arm-side switching elements, and the switching elements 304-306 are called lower arm-side switching elements.

The current detecting circuit 8 is connected to the lower arm-side switching elements 304–306. The current detecting circuit 8 normally operates when the lower arm-side switching elements 304–306 are turned on for a period that is longer than a prescribed time. Each phase current is calculated as follows:

> Reference value of U-phase current=(detected power source voltage×U-phase PWM duty ratio−U-phase terminal voltage)÷wire resistance between a terminal 307 and a terminal 308 (b)

> Reference value of V-phase current=(detected power source voltage×V-phase PWM duty ratio−V-phase terminal voltage)÷wire resistance between a terminal 307 and a terminal 309 (c)

> Reference value of W-phase current=(detected power source voltage×W-phase PWM duty ratio−W-phase terminal voltage)÷wire resistance between a terminal 307 and a terminal 310 (d)

Incidentally, the resistance between the terminal 307 and the terminal 308, the resistance between the terminal 307 and the terminal 309 and the resistance between the terminal 307 and 310 are directly measured when the driver circuit 43 is formed on a circuit board. However, the resistances can be estimated from the characteristics of the elements and parts that form the driver circuit 43. Because the resistances do not change, current flowing through each of the resistances can be detected by detecting voltage across each of the resistances. That is, it is not necessary to provide another current detecting circuit for the upper arm-side switching elements 301–303.

Figure 5:
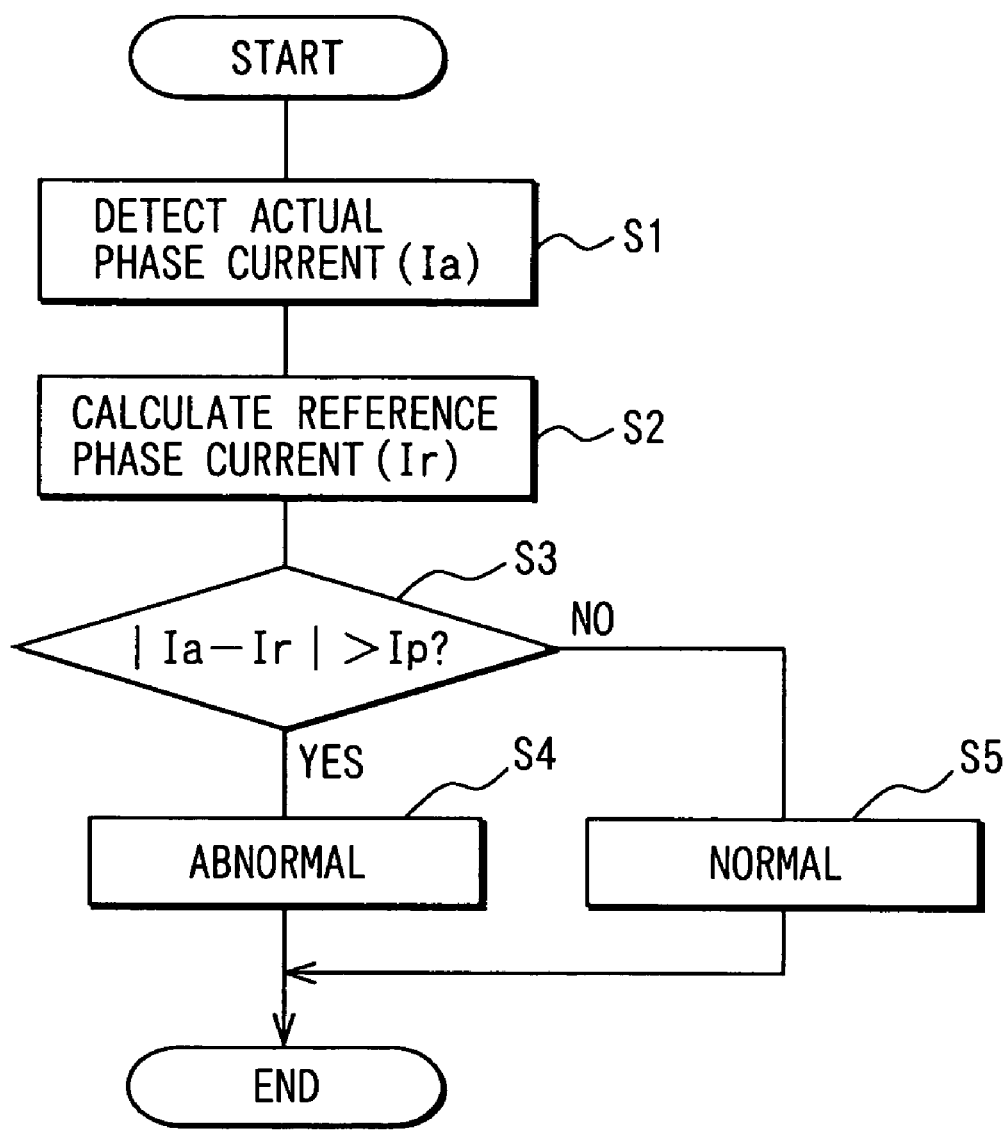
FIG. 5 is a flow diagram showing a first way of detecting abnormal current.

A method of abnormality detecting according the first embodiment of the invention will be discussed with reference to FIG. 5.

At first, each actual phase current (Ia) is detected at step S1.

Subsequently, a reference value of each phase current (Ir) is calculated according to one of the expressions (b), (c) and (d) at step S2.

Then, the actual phase current is compared with the reference value (Ir) at step S3. If the difference is larger than a preset value (Ip), it is judged that the actual phase current is abnormal at step S4. On the other hand it is judged that the actual phase current is normal at step S5 if the difference is not larger than the preset value (Ip).

Figure 6:
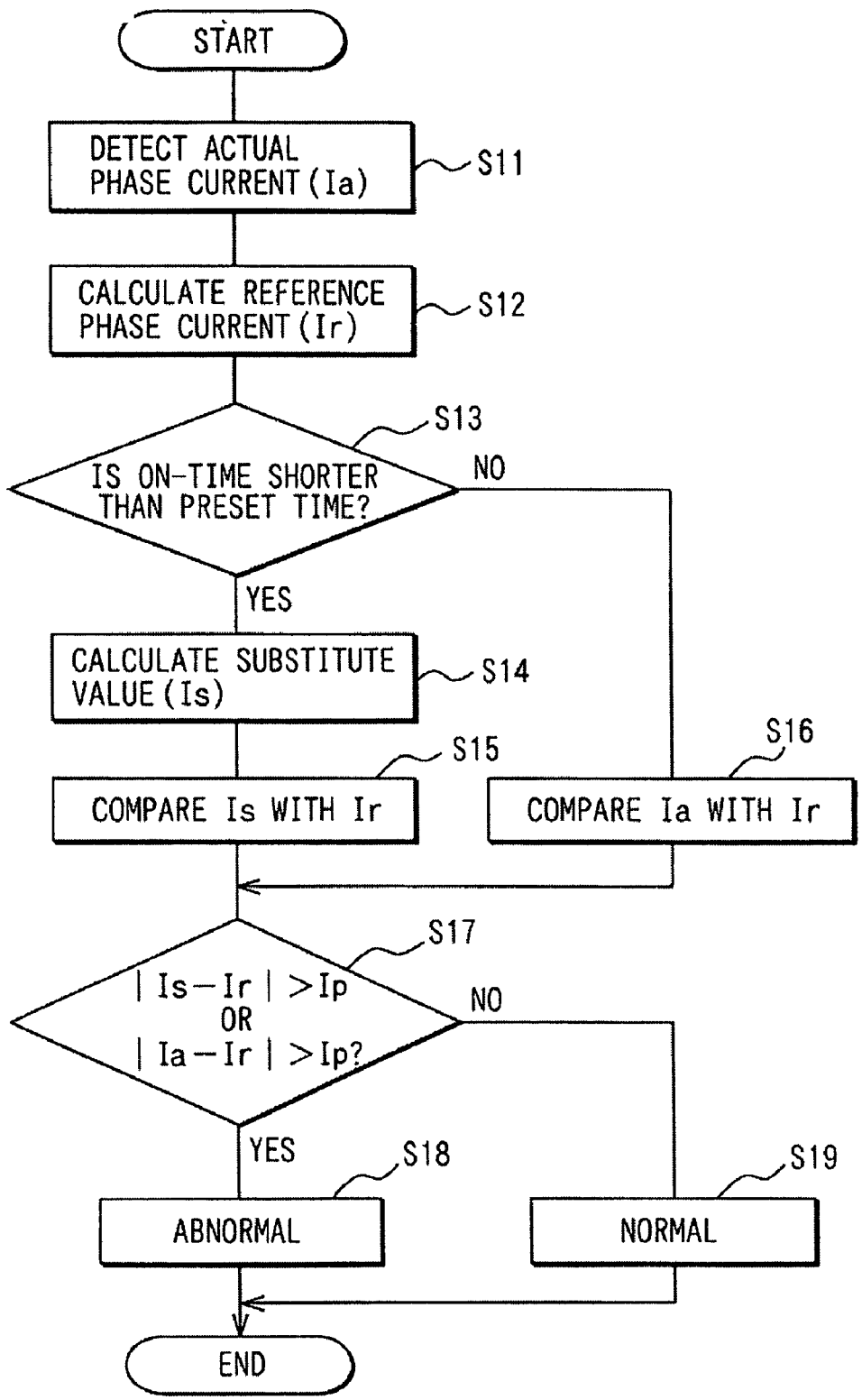
FIG. 6 is a flow diagram showing a second way of detecting abnormal current.

A method of abnormality detecting according to the second embodiment of the invention will be discussed with reference to FIG. 6.

This method is based on a well-known fact that the total sum of the respective amounts of U-phase-current, V-phase current and W-phase current is zero.

At first, each actual phase current (Ia) is detected at step S11.

Subsequently, a reference value of each phase current (Ir) is calculated according to one of the expressions (b), (c) and (d) at step S12.

Then, on-time of the phase current is compared with a preset time at step S13. If the on-time of actual phase current flowing through one phase-winding (e.g. U-phase winding) is shorter than the preset time, the amount of the actual phase current (Ia) flowing through the one phase winding (e.g. U-phase winding) is substituted by a substitute current value (Is) that is calculated from amounts of phase current flowing through other two phase windings (e.g. V and W-phase windings) at step S14, as follows:

> substitute U-phase current=0−(actual amount of V-phase current+actual amount of W-phase current) (e)

> substitute V-phase current=0−(actual amount of W-phase current +actual amount of U-phase current) (f)

> substitute W-phase current=0−(actual amount of U-phase current +actual amount of V-phase current) (g)

Subsequently, the substitute phase current (Is) is compared with the reference value (Ir). On the other hand, the actual phase current (Ia) is compared with the reference value (Ir) at step S16, if the on-time of the actual phase current (Ia) flowing through all the phase windings is not shorter than the preset time.

If the difference between the substitute phase current (Is) or the actual phase current (Ia) flowing through one of the phase windings and the reference current (Ir) is found larger than a preset current value (Ip) at step S17, it is judged that such substitute or actual phase current is abnormal at step S18. On the other hand it is judged that the substitute or actual phase current is normal at step S19 if the difference is not larger than the preset value.

Incidentally, the substitute phase current (Is) can be adopted even if the on-time of the corresponding actual phase current (Ia) is not shorter than the preset time.

A method of abnormality detecting according to the third embodiment of the invention will be described below.

If the on-time of phase current (e.g. U-phase current) flowing through one of the phase windings U, V, W is not larger than a preset time, the amount of the phase current (e.g. U-phase current) is calculated by one of the expression corresponding to the phase current (eg. the expression (b)).

Then, the d-axis current and the q-axis current are calculated from the phase current (e.g. U-phase current) by use of the following expression E2:

> vector current=√((q-axiscurrent)^2+(d-axiscurrent)^2)

Then, a command current value is calculated by the following expression:

> command current value=battery voltage (V)×q-axis command duty ratio (%)÷minimum wire resistance (Ω)+generation current (A) ... (h), wherein the wire resistance is the same as the resistance used in the expressions (b), (c), or (d), and the generation current is a quotient of the number of rotation of the motor by the number of rotation thereof per one-ampere. Incidentally, the generation current appears only when the rotation direction is different from the direction for the q-axis command duty ratio. If the rotation direction of the motor is the same as the direction for the q-axis command duty ratio, the generation current becomes zero. Incidentally, the q-axis command duty ratio is given by the q-axis proportional integrating control section, and the number of rotation of the motor is calculated from the signal of the rotation angle sensor 7.

If the difference between the vector current given by the expression E2 and the command current given by the expression (h) is larger than a preset value, it is judged abnormal. Even if the on-time of the phase current for all the phase windings U, V W is longer than a preset time, this method can be adopted.

The wire resistance can be calculated by the following expression:

> wire resistance (Ω)=battery voltage (V)×q-axis command duty ratio (%)÷vector current (A)

A method of detecting abnormality according to the fourth embodiment of the invention will be described below.

If the on-time of phase current (e.g. U-phase current) flowing through one of the phase windings U, V, W is not larger than a preset time, the amount of the phase current (e.g. U-phase current) is calculated by one of the expression corresponding to the phase current (eg. the expression (b)).

Then, a reference vector current is calculated by the following expression:

reference vector current=$\sqrt{3/2}$×(the amount of the phase current calculated by one of the expressions (b), (c), (d))      (i)

Subsequently, actual vector current is calculated by the expressions E1 and E2. If the difference between the reference vector current and the actual vector current is larger than a preset value, it is judged abnormal.

A method of detecting abnormality according to the fifth embodiment of the invention will be described below.

At first, an amount of actual phase current whose on-time is not longer than a preset time period is calculated according to one of the expressions (e), (f) and (g), which is based on the amounts of other two phase current.

Subsequently, a command current value is calculated by the expression (h), which is compared with the amount of the actual current to judge abnormality if the difference between those two is larger than a preset value. Incidentally, the calculation of an amount of the actual phase current can be adopted even if the on-time thereof is longer than a preset time.

A method of detecting abnormality according to the sixth embodiment of the invention will be described below.

At first, a command current value is calculated by the expression (h). Subsequently, an amount of vector current is calculated by the expressions E1 and E2. Then, the command current value and the amount of the vector current are compared to judge abnormality if the difference between the command current value and the amount of the vector current is larger than a preset value. Incidentally, the above calculation can be adopted even if the on-time thereof is longer than a preset time.

A method of detecting abnormality according to the seventh embodiment of the invention will be described below.

At first, an amount of actual phase current whose on-time is not longer than a preset time period is calculated according to one of the expressions (e), (f) and (g), which is based on the amounts of other two phase current. Then, an amount of reference vector current is calculated by the expression (i). Subsequently, an amount of vector current is calculated by the expressions E1 and E2. If the difference between the reference vector current and the actual vector current is larger than a preset value, it is judged abnormal. Incidentally, the above calculation can be adopted even if the on-time thereof is longer than a preset time.

One of the above-described methods of detecting abnormality when a short circuit takes place between the terminal 312 and 313 of the driver circuit 43 shown in FIG. 3 will be described in more detail with reference to FIGS. 3, 7A and 7B.

The power source voltage is 12 V, and the resistance of the motor 15 is 153 mΩ, The number of rotation of the motor 15 is zero, while sinusoidal wave voltage of 50±15(%) duty ratio is applied to the terminals 301-303 in the driver circuit 43. As shown in FIG. 7A, the difference in phase between the U-phase current and V-phase current is 180°, and the maximum amount of the phase current is 14.6 A. No current flows in the W-phase winding. The vector current is calculated from the amount of the phase current that is directly measured, as shown in FIG. 7B. The maximum value of the vector current is 20.7 A.

The reference value of the U-phase current is given by the expression (b) as follows:

12(V)×15(%)÷153 (mΩ)=11.8 (A)

The reference value of the vector current is given by the expression (i) as follows:

$\sqrt{2/3}$×11.8 (A)=14.4 (A)

Figure 7A:
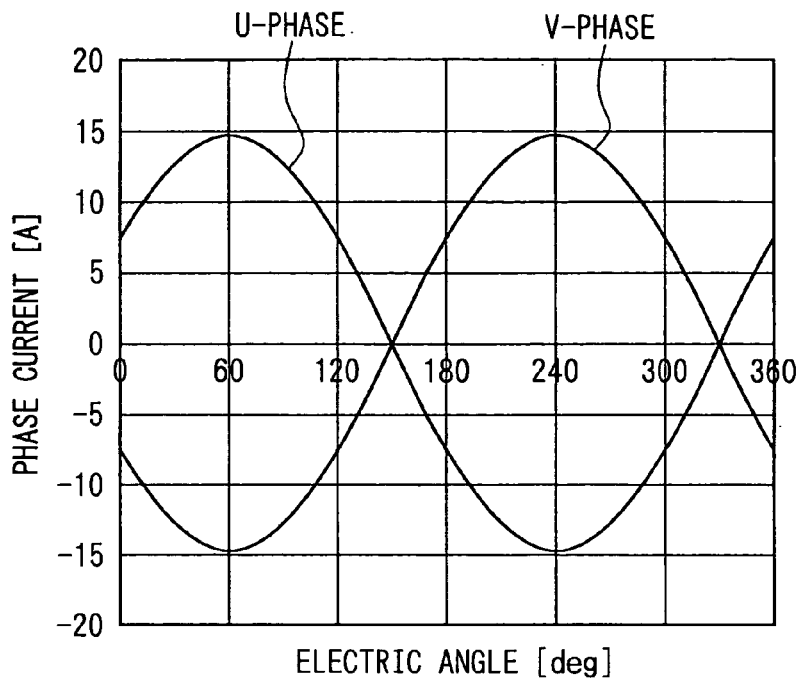
FIG. 7A is a graph showing a relationship between the amount of phase current and the electric angle of the phase current.
Figure 7B:
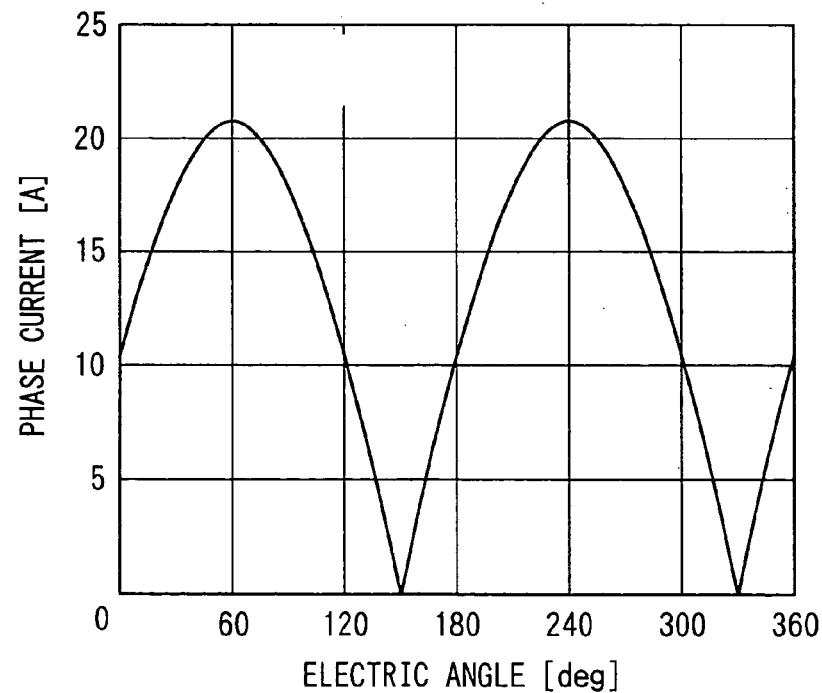
FIG. 7B is a graph showing a relationship between the amount of vector current and the electric angle of the vector current.

Because FIG. 7A shows that the maximum amount of the measured U-phase current is 14.6 (A), the reference value of the U-phase current is sufficiently different (24%) to judge abnormality. The reference value of the vector current is also sufficiently different (44%) from the maximum amount of the measured vector current of 20.7(A) to judge abnormality, as shown in FIG. 7B. In this case, an abnormality can be judged if the difference between the reference value and the measured value is more than 20%.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A motor driving system for an electric motor having a plurality of phase windings, said motor driving system comprising:

a power source having a DC power source voltage (Vp);

a pulse width modulating circuit which provides driving pulse signals for driving said phase windings, each of said driving pulse signals having pulses whose pulse width is modulated to have a prescribed duty ratio (Rd);

an inverter having first switch elements respectively disposed between said phase windings and said power source and second switch elements respectively disposed between said phase windings and a ground, said flint and second switch elements being controlled according to the driving signals of said pulse width modulating circuit;

a voltage calculating circuit for calculating level, of input voltage (Vi) to be respectively applied between said power source and said phase windings of said electric motor;

a reference current calculating circuit for calculating reference values of current of said inverter from levels of the voltage applied between said power source and said phase windings of said electric motor, resistances disposed between said power source and said phase windings of said electric motor and the prescribed duty ratio;

a current detecting circuit for detecting actual values of current of said inverter; and means for judging abnormality of phase current if one of the actual value of current of said inverter is a preset value different from corresponding one of the reference values.

2. The motor driving system as claimed in claim 1, wherein said voltage calculating circuit comprises means for calculating the levels of input voltage according to the following expression:

$$Vi = Vp \times Rd - \text{(a voltage applied to said motor)},$$

where Vi is the input voltage, Vp is the DC power source voltage, and Rd is the prescribed duty ratio.

3. The motor driving system as claimed in claim 1, wherein said means for judging comprises means for comparing the actual value of current of said inverter and corresponding one of the reference values.

4. The motor driving system as claimed in claim 1, wherein said current detecting circuit comprises means for calculating an actual value of current of said inverter from other detected actual values of current of said inverter.

5. The motor driving system as claimed in claim 1, further comprising:
means for providing command current values based on the voltage applied to said motor, motor current and the number of rotation of said motor,
wherein said means for judging judges the abnormality if one of said command current values is a preset value different from corresponding one of the reference values.

6. The motor driving system as claimed in claim 1, further comprising:
means for calculating reference values of vector current from the reference values of current of said inverter that is calculated by said current calculation circuit; and
means for calculating actual vector current from the actual values of current detected by said current detecting circuit;
wherein said means for judging judges the abnormality if one of the actual vector current is a preset value different from corresponding one of the reference vector current.

7. A motor driving system for an electric motor having a plurality of phase windings, said motor driving system comprising:
a power source baying a DC power source voltage;
a pulse width modulating circuit which provides driving pulse signals for driving said phase windings, each of said driving pulse signals having pulses whose pulse width is modulated to have a prescribed duty ratio;
an inverter having first switch elements respectively disposed between said phase windings and said power source and second switch elements respectively disposed between said phase windings and a ground, said first and second switch elements being controlled according to the driving signals of said pulse width modulating circuit;
a current detecting circuit, including means for calculating an actual value of current of said inverter from other detected actual values of current of said inverter, for detecting actual values of current of said inverter;
means for providing command current values based on the voltage applied to said motor, motor current and the number of rotation of said motor, and
means for judging abnormality of phase current if one of the actual values of current of said inverter detected by said current detecting circuit is a preset value different from corresponding one of the command current values.

8. A motor driving system for an electric motor having a plurality of phase windings, said motor driving system comprising:
a power source having a DC power source voltage;
a pulse width modulating circuit which provides driving pulse signals for driving said phase windings, each of said driving pulse signals having pulses whose pulse width is modulated to have a prescribed duty ratio;
an inverter having first switch elements respectively disposed between said phase windings and said power source and second switch elements respectively disposed between said phase windings and a ground, said first and second switch elements being controlled according to the driving signals of said pulse width modulating circuit;
a current detecting circuit for detecting actual values of current of said inverter;
means for calculating actual vector current values from the actual values of current detected by said current detecting circuit;
means for providing command current values based on the voltage applied to said motor, motor current and the number of rotation of said motor, and
means for judging abnormality of phase current if one of the actual vector current values is a preset value different from corresponding one of the command current values.

9. A motor driving system for an electric motor having a plurality of phase windings, said motor driving system comprising:
a power source having a DC power source voltage;
a pulse width modulating circuit which provides driving pulse signals for driving said phase windings, each of said driving pulse signals having pulses whose pulse width is modulated to have a prescribed duty ratio;
an inverter having first switch elements respectively disposed between said phase windings and said power source and second switch elements respectively disposed between said phase windings and a ground, said first and second switch elements being controlled according to the driving signals of said pulse width modulating circuit;
a current detecting circuit for detecting actual values of current of said inverter, said current detecting circuit including means for calculating an actual value of current of said inverter from other detected actual values of current of said inverter, for detecting actual values of current of said inverter;
means for calculating actual vector current values from the actual values of current calculated by said current detecting circuit;
means for providing command current values from the actual values of current detected by said current detecting circuit, and
means for judging abnormality of phase current if one of the actual vector current values is a preset value different from corresponding one of the command current values.

* * * * *

UNITED STATES PATENT AND TRADEMARK OFFICE
CERTIFICATE OF CORRECTION

PATENT NO. : 7,199,538 B2 Page 1 of 1
APPLICATION NO. : 10/972444
DATED : April 3, 2007
INVENTOR(S) : Hisashi Kameya and Masahiro Miyata It is certified that error appears in the above-identified patent and that said Letters Patent is hereby corrected as shown below:

Title page, item (75) inventors; should read as follows:

Hisashi KAMEYA, Kariya-city (JP);
Masahiro MIYATA, Kariya-city (JP).

Signed and Sealed this

First Day of April, 2008

JON W. DUDAS
*Director of the United States Patent and Trademark Office*